No. 705,304. Patented July 22, 1902.
C. T. B. SANGSTER.
MOTOR VEHICLE.
(Application filed Feb. 24, 1902.)
(No Model.) 7 Sheets—Sheet 6.
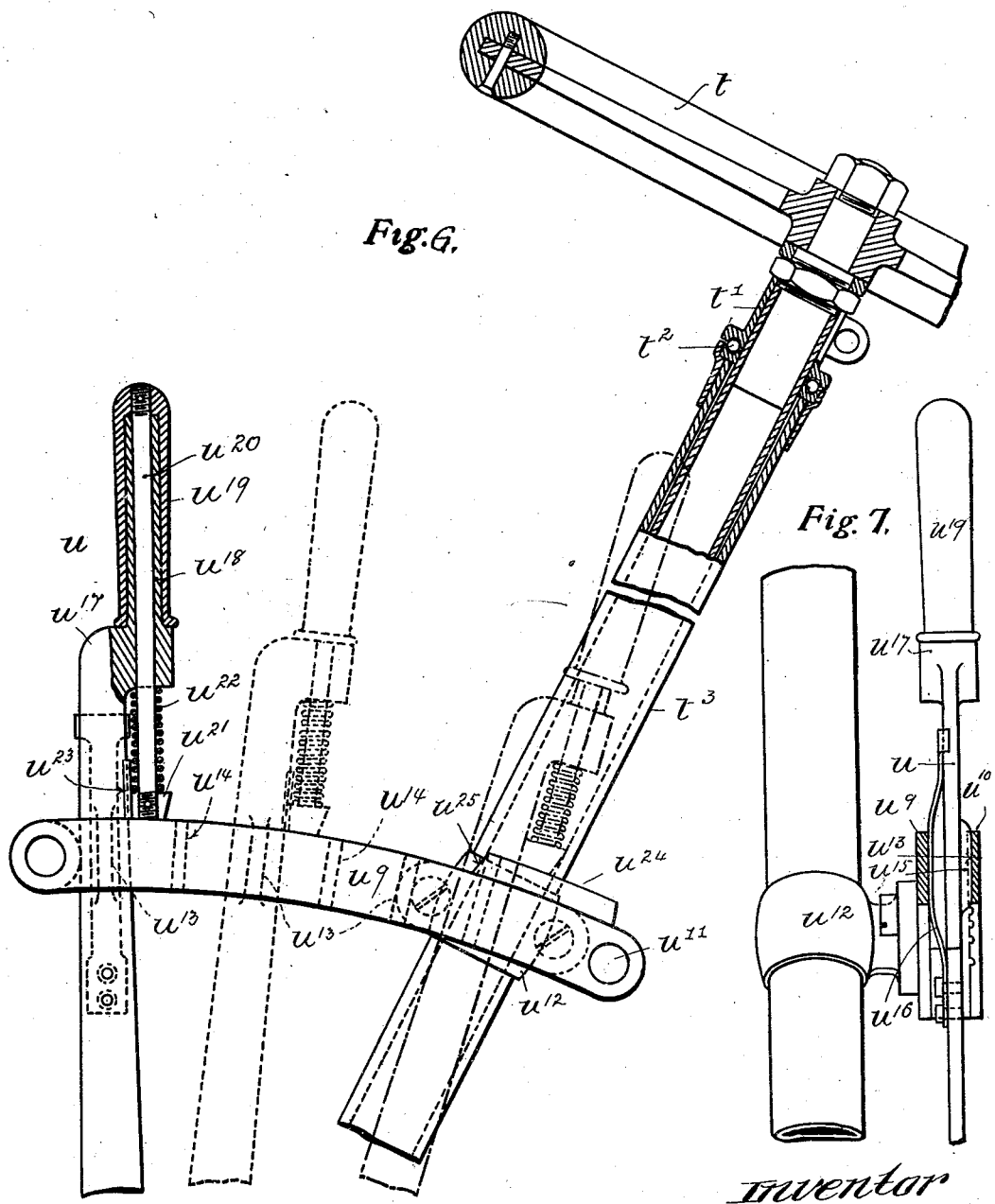
WITNESSES
INVENTOR
Charles T. B. Sangster
By James L. Norris.
Atty.

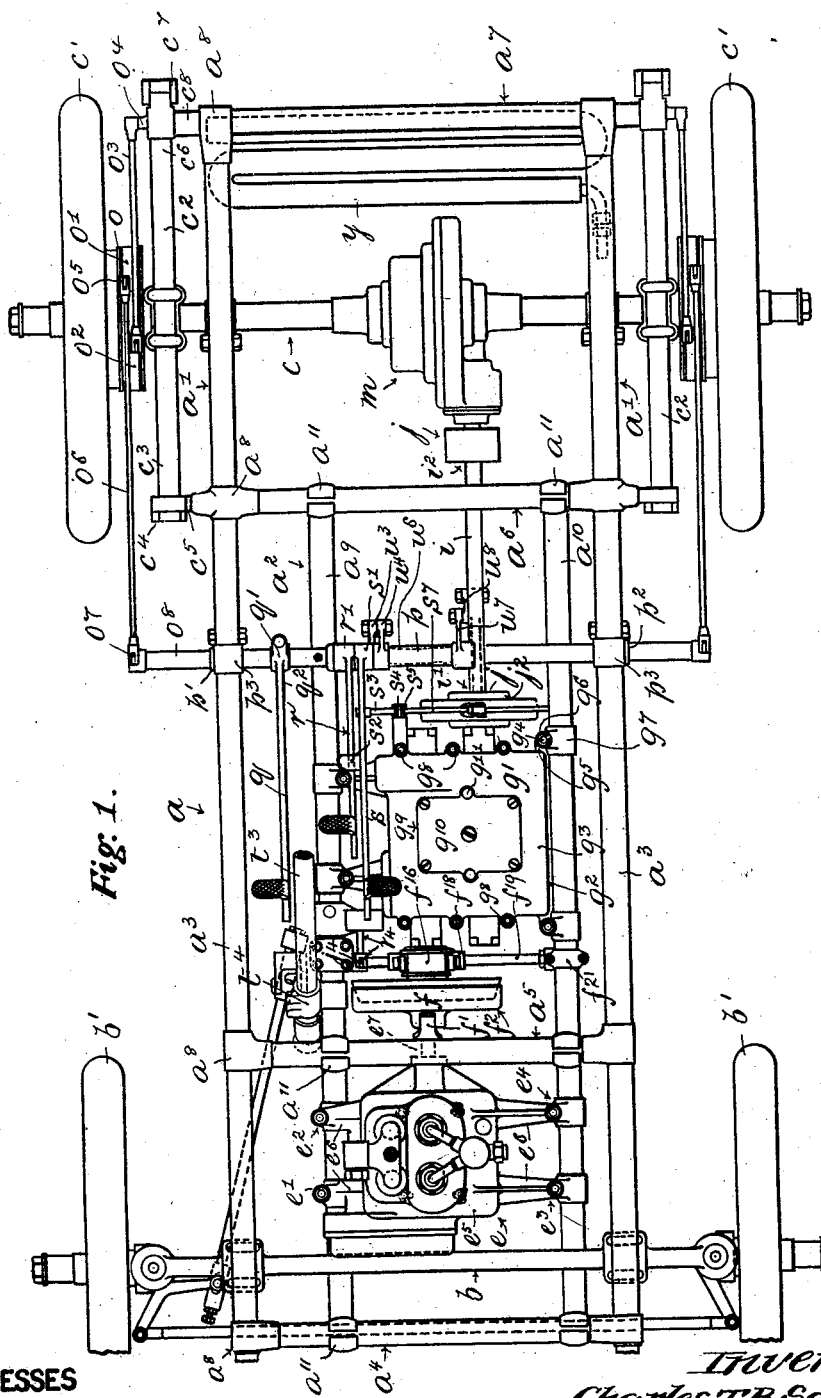

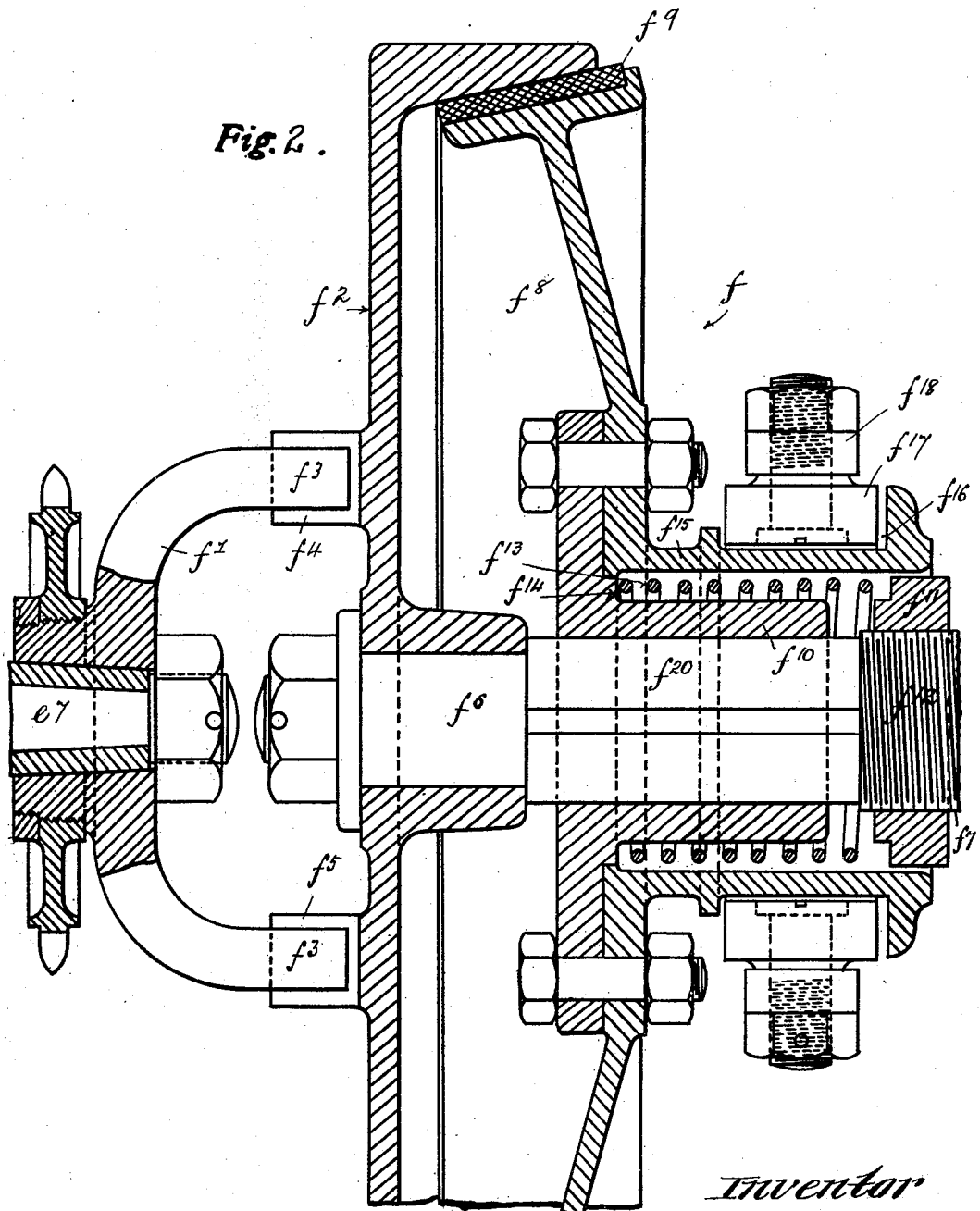

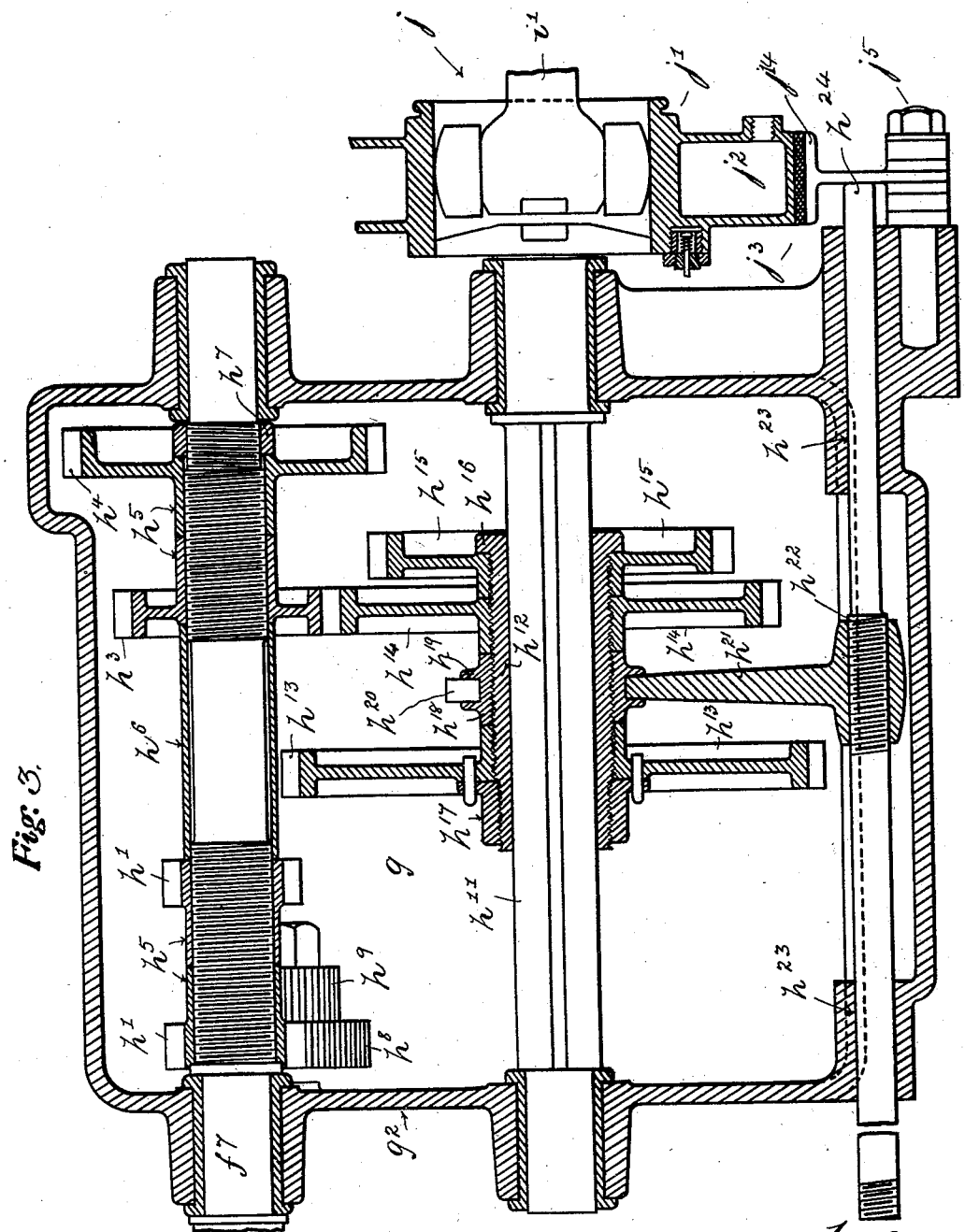

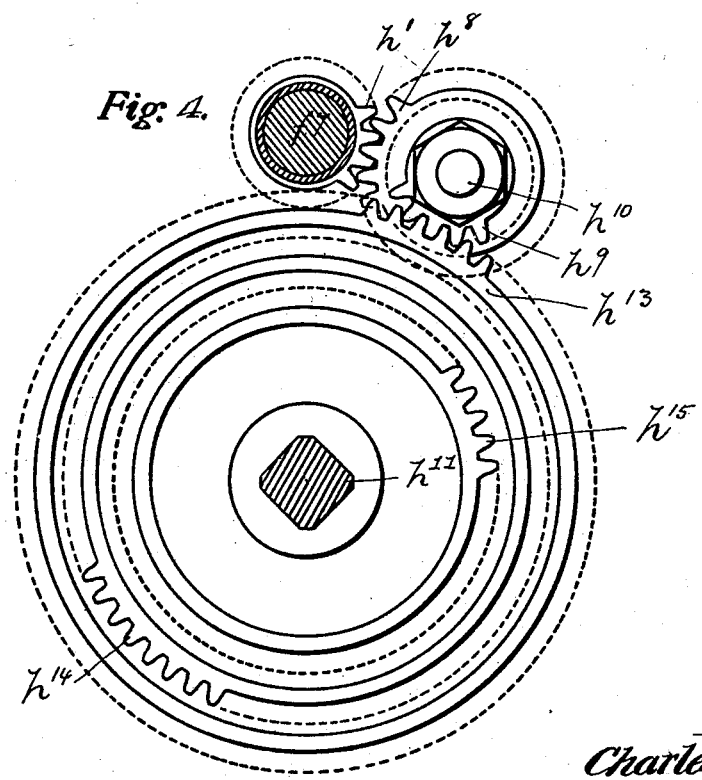

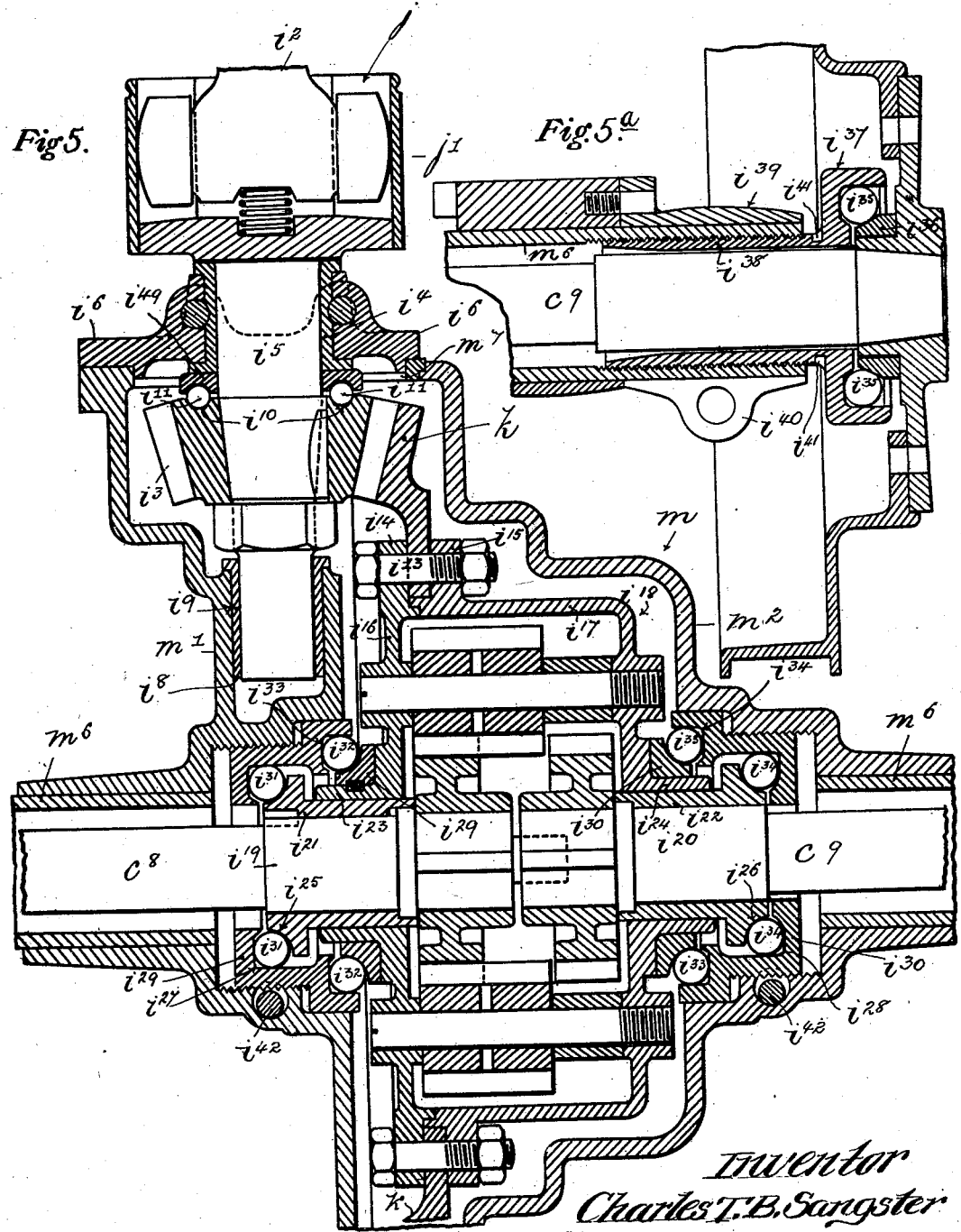

No. 705,304. Patented July 22, 1902.
C. T. B. SANGSTER.
MOTOR VEHICLE.
(Application filed Feb. 24, 1902.)
(No Model.) 7 Sheets—Sheet 7.
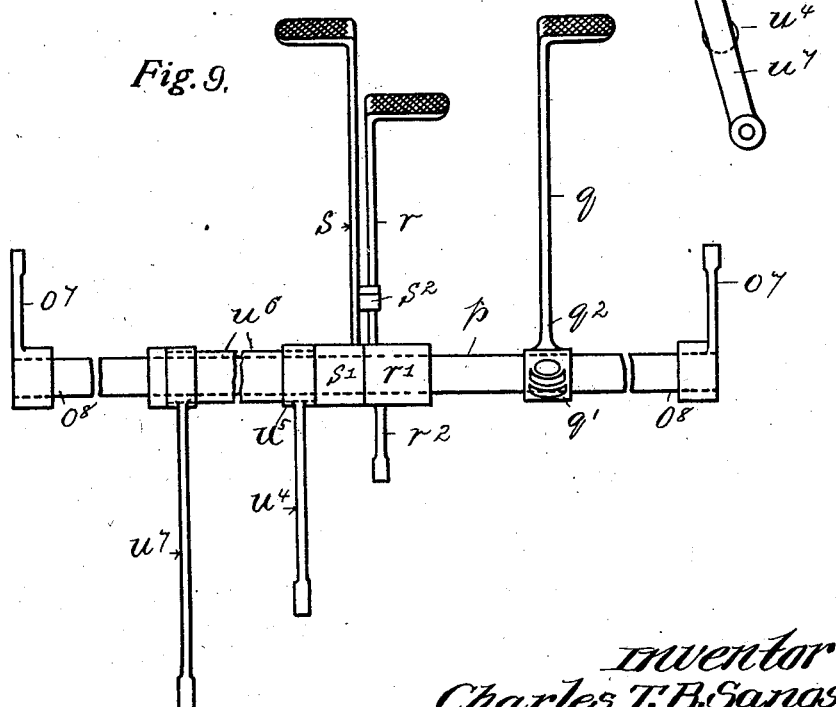

UNITED STATES PATENT OFFICE.

CHARLES THOMAS BROCK SANGSTER, OF BIRMINGHAM, ENGLAND.

MOTOR-VEHICLE.

SPECIFICATION forming part of Letters Patent No. 705,304, dated July 22, 1902.

Application filed February 24, 1902. Serial No. 95,290. (No model.)

*To all whom it may concern:*

Be it known that I, CHARLES THOMAS BROCK SANGSTER, general manager of Components Limited, a subject of the King of Great Britain, residing at Componentsville, Bowenbrook, Birmingham, England, have invented certain new and useful Improvements in Motor-Cars, of which the following is a specification.

This invention has reference to motor-cars or motor-driven vehicles for common roads, and has for its objects to generally simplify the construction and arrangement of the whole of the parts of the car in such a manner that the same are readily accessible for inspection or repair, although thoroughly protected from dust and mud, the manufacture or building up of the vehicle or car and the relative adjustment of the various parts are greatly facilitated, the vehicle is completely under the control of the driver under all speeds, and its general efficiency is enhanced.

Further objects are to provide vehicles of this class with a simple form of speed and reversing gear giving three speeds forward and one backward; also, to provide, in connection with the change-speed gear, a convenient and simple means for controlling the same, so arranged that it is practically impossible for the driver to inadvertently throw in the backward gear when ascending a hill or under other circumstances, and, further, to provide a simple and efficient balance or differential gear having means for readily adjusting the pinion on the driving-shaft with the toothed wheel on the main axle.

The vehicle comprises generally a framing built up of tubing and mounted upon two axles, the front one carrying the steering-wheels and the rear one the driving-wheels, while on top of the frame is a body and a bonnet or hood inclosing the motor which is carried upon the frame and drives the counter-shaft through a friction-clutch and speed-gear, both of which embody novel features, as hereinafter more fully referred to. The counter-shaft gears onto the main axle through adjustable differential or balance gear in connection with the latter. Means are provided for throwing in and disconnecting the main clutch, actuating the speed-gear, and applying brakes to the driven axle and the main shaft, the whole of these features and the manner of operating same, together with the advantages to be derived by their use for the particular purposes for which they have been designed, being hereinafter fully described with reference to the accompanying drawings, in which—

Figure 1 of the accompanying drawings represents a plan view of the car with the body of the vehicle and the motor-bonnet removed in order to more clearly show the relative dispositions of the motor and its accessories—the main clutch, the speed-change and reversing gear, the main driving-shaft, and adjustable differential gear interposed between the said main shaft and the rear or live axle. This figure shows the whole general arrangement of the steering-gear and the system of levers for controlling the brakes, the main clutch, and the change-speed gear, also the construction and arrangement of the framing and the methods employed for mounting the various parts of the car thereon. Fig. 2 represents a full-sized sectional view of the main driving-clutch, which is arranged between the engine and the speed-change and reversing gear. Fig. 3 is a longitudinal section view showing the general arrangement of the speed-change and reversing gear, and Fig. 4 is a diagrammatic view showing how the gearing is arranged to obtain the reverse or backward drive. Figs. 5 and 5ª are views showing a full horizontal section of the improved adjustable differential gearing arranged between the driving-shaft and the rear or live axle of the car. Fig. 6 represents, partly in elevation and partly in section, the arrangement of the steering-column and the lever and the special means provided in conjunction therewith for actuating the change-speed gear and for throwing the backward gear into action. Fig. 7 is another view of the same parts as are shown in Fig. 9. Figs. 8 and 9 are detail views showing the arrangement of the system of foot-levers controlling the brakes and clutch, together with the single carrier-shaft on which the said levers are mounted.

The same letters of reference indicate corresponding parts in the several figures of the drawings.

The tubular framing $a$ is in two parts—viz., the main framing $a'$, which is spring-supported upon the axles $b$ $c$ of the road-wheels $b'$ $c'$ and carries the body with motor-bonnet, water-tank, and spare-petrol tank, and a supplementary or under frame $a^2$, to which the motor and the speed-gear box are adjustably connected by clips.

The main framing $a'$ consists of two longitudinal parallel tubes $a^3$ $a^3$, running throughout the length of the car and coupled together transversely by means of four tubular cross-stays $a^4$ $a^5$ $a^6$ $a^7$, the first of which, $a^4$, comes at the extreme front and the last named, $a^7$, at the rear end, with the third stay, $a^5$, being disposed just behind the motor, while the fourth one is situated in an intermediate position between the speed-gear box and the driven or live axle, the said longitudinal and transverse members being rigidly secured together by brazing the ends of the latter into the sockets of suitable junction-lugs $a^8$, carried upon and made fast to the former, as clearly shown in the general plan view, Fig. 1.

The underframing $a^2$ consists of a pair of longitudinal parallel tubes $a^9$ $a^{10}$, set inward of and below the side members of the top frame $a'$ and suspended by means of a series of hangers $a^{11}$ from the three foremost cross members $a^4$ $a^5$ $a^6$, it being clearly shown in Fig. 1 how the said longitudinal members $a^9$ $a^{10}$ of the underframing extend from the front cross-stay $a^4$ to the tube $a^6$, which comes between the speed-gear and the driven axle and terminate in the sockets of the hangers suspended from said tube $a^6$.

A pair of lamina-springs $c^2$ are carried on the back axle $c$, (the construction of which will be hereinafter described,) and their front ends $c^3$ are respectively connected by jointed shackles $c^4$ to pins or arms $c^5$, screwed or otherwise attached to bosses on the outer side of the junction-lugs of the third cross-tube $a^6$, while the rear ends $c^6$ of the said springs are connected by shackles $c^7$ to brackets $c^8$, brazed or clipped onto ends of the rearmost cross-tube $a^7$ and extending a little beyond the junction-lugs.

The motor $e$ is adjustably connected to the front part of the underframing $a^2$, immediately behind the axle $b$ of the front wheels, by four split clips $e'$ $e^2$ $e^3$ $e^4$, arranged, as clearly shown in Fig. 1, in pairs, one on either side of the crank-box $e^5$, which has a corresponding number of brackets or lateral arms $e^6$, having the said clips at their outward terminations. This method of mounting admits of the said motor being moved longitudinally upon its carrier-tubes and greatly facilitates the building up and setting or adjustment of the same relative to the other parts of the driving mechanism. It also enables the motor to be readily detached and bodily removed from the framing of the car when necessary, but without disturbing the adjustments of any of the other parts. The motor itself is of the twin-cylinder water-jacketed "de Dion" type, preferably with electrical ignition, and its precise construction will be described hereinafter.

The crank-shaft $e^7$ carries at its rearward outer end a forked coupling $f'$, by which the engine is connected with the driving part $f^2$ of the friction-clutch $f$, (shown full size in Fig. 2,) the said connection being effected by the branches $f^3$ of the said fork $f'$ engaging, respectively, between pairs of separated lugs $f^4$ $f^5$ on the front face of the said clutch element $f^2$. This arrangement will admit of either the motor or the part on which the clutch is mounted—viz., the speed-gear box—being removed from the supporting-frame without disturbing the other part, and also will enable the erector in building up the car or refitting either part to get just the right clearance between the crank-shaft and clutch to insure a nice adjustment and free working without longitudinal thrust.

The outer drum or driving element $f^2$, which is constantly coupled to the motor by the forked connection above described and is always running when the motor is at work, is loosely mounted upon the necked forward extremity $f^6$ of the top shaft $f^7$ of the speed-change gear, while said shaft extends forward beyond its front bearing in the gear-box for a distance sufficient to carry the whole of the parts of the friction-clutch, whose driven element or inner conoidal drum $f^8$ is faced with leather or other suitable material on its contact periphery $f^9$ and is bolted to a longitudinally-sliding sleeve $f^{10}$, mounted upon a squared or angular part $f^{20}$ of the shaft $f^7$ between the necked bearing $f^6$ of the driving-drum and a stop-collar $f^{11}$, screwed onto a wormed part $f^{12}$ of the shaft contiguous to its bearing in the forward side of the change-gear box. A strong spiral spring $f^{13}$ is disposed between a shoulder $f^{14}$ on the sliding sleeve $f^{10}$ and the stop-collar $f^{11}$, said spring being compressed when the clutch is thrown out of gear, and is thereby made active for throwing the said clutch in again when the disconnecting-lever is released. The driven drum also has extending backward from it a cast-on or integral sleeve $f^{15}$, which incloses the spring and stop-collar and has a channel or race $f^{16}$ formed circumferentially around its outer periphery to receive the rollered ends $f^{17}$ of a pair of swinging arms or levers $f^{18}$, keyed to a transversely-disposed rock-shaft $f^{19}$, arranged between the clutch and the speed-gear box, with the opposed ends thereof turning in bearings carried by split clips $f^{21}$, adjustably mounted upon the longitudinal tubes of the underframing, which construction admits of the said shaft, with levers, being readily set in its proper position relative to the clutch in building up the car and facilitates also the detachment of these parts in case of necessity. The rock-shaft carries a third lever $j^4$, connected by means of a rod $r^4$ to the actuation mechanism under the driver's control for throwing out and putting in the clutch. The three-speed and reversing gear $g$ and its inclosing casing $g'$ are so constructed, mounted, and arranged as to admit of the removal of either of the two shafts therefrom bodily, with all the gear-wheels carried by them, when the upper part of the gear-box is removed. The gear-box itself, which is preferably cast in aluminium, is made in two principal parts—viz., the lower or main portion $g^2$ and the top or cover $g^3$, the first-named being detachably and adjustably secured to the longitudinal tubes of the underframe by means of bolts $g^4$, passed through eyed lugs $g^5$, cast on the opposite sides of the casing-section $g^2$, and through the eyed ears $g^6$ of clip-fittings $g^7$, carried upon the tubes, so that by screwing up the nuts on the ends of the said bolts $g^4$ the casing is secured to the clips and the clips are gathered around the said tubes by the same operation. The cover $g^3$ of the gear-box is detachably secured to the lower part by a series of long bolts $g^8$, passed through coincidently-arranged eyed lugs on the two sections, with the nuts of the said bolts coming upon and extending above the flush top of the cover and in positions which will admit of them being readily turned by a spanner, so that the cover may be easily removed for getting access to the gear when the car is on the road. In the top of the cover is an inspection-hole $g^9$, through which the inclosed gear may be viewed, and which is fitted with a detachable lid $g^{10}$, held down by a couple of nuts and bolts $g^{11}$. The dividing-line between the two sections of the gear-box is cranked, so as to pass horizontally through the centers of the bearings of the shaft, (one of which is disposed at a higher level than the other,) so as to admit of the said shafts being lifted out of their bearings when the cover is removed.

The top or driving shaft $f^7$ of the speed-gear runs through from end to end of the gear-box, with the halves of its split bearings coming respectively in the upper and lower sections of the said box, and upon it are secured four driving-pinions $h'$ $h^2$ $h^3$ $h^4$, kept at the required distance apart and in their proper positions relative to the ends of the box by extended bosses $h^5$, (which are screwed onto wormed parts of the shaft,) and a distance-sleeve $h^6$, the whole being made fast by a lock-nut $h^7$ or other convenient means. These driving-pinions are arranged in the following order, commencing from the front end, viz: the reversing-pinion $h'$, the slow-speed pinion $h^2$, the intermediate pinion $h^3$, and the high-speed pinion $h^4$. The reverse-pinion is constantly in mesh with the larger wheel $h^8$ of a twin pinion $h^8$ $h^9$, carried upon a fixed stud $h^{10}$, mounted on the front end of the gear-box parallel with and a little below and to one side of the driving-shaft $f^7$. The second and smaller wheel $h^9$ of the twin pinion comes innermost and is adapted to be engaged by a shifting toothed wheel $h^{13}$ on the driven shaft $h^{11}$ of the gearing when it is required to run the car backward. The said driven shaft $h^{11}$ of the speed-gearing is in direct connection with the counter-shaft running to the differential gear on the rear axle and is arranged parallel with but to one side of and at a lower plane than the driving-shaft $f^7$, the relative arrangement of the two shafts and the stud $h^{10}$ on which the twin reversing-pinion runs being such that the centers of the driving-shaft and the stud are both exactly the same distance from the center of the driven shaft, this arrangement being essential in order to insure the proper meshing of the teeth. The halves of the split bearings of the driven shaft are formed, respectively, in the upper and lower segments of the box and are intersected by the dividing-line between the two parts. The driven shaft itself, inward of the bearing ends, is of a squared or angular section, and upon it is arranged a sliding sleeve $h^{12}$, upon which are screwed three driven toothed wheels—viz., a large wheel $h^{13}$, adapted to be engaged either with the slow-speed pinion $h^2$ on the driven shaft for forward driving at the slowest speed or with a smaller part of the twin reversing-pinion $h^{10}$ for driving the car slowly backward, a second and smaller wheel $h^{14}$, which may be geared with the intermediate-speed pinion $h^3$, and a third wheel $h^{15}$, which is of the same or approximately the same diameter as the high-speed pinion $h^4$, with which it is adapted to be engaged. The wheels are screwed up to a stop-collar $h^{16}$ at the end of the sleeve and are made fast by a lock-nut $h^{17}$ and cotters, while between the bosses of the low and intermediate speed wheels is a screwed-on distance-piece or bush $h^{18}$, with a circumferential groove or race $h^{19}$ around its outer periphery, in which the branches of the forked end $h^{20}$ of the sleeve-shifting arm $h^{21}$ lie. The said shifting-arm $h^{20}$ is made fast by screwing or otherwise to a sliding rod $h^{22}$, situated below and in the same vertical plane as the driven shaft and guided in bearings $h^{23}$, formed in the fixed part of the gear-box, with its rearward end $h^{24}$ extending to the outside of the said box, where it is connected with an arm of the speed-regulating lever.

To change the running speed of the car, the driver moves the sliding rod by means of the lever and according to the speed desired thereby causes one of the wheels on the driven shaft to come into mesh with its particular driving-pinion on the driving-shaft, or in case he desires the car to run backward at a slow speed he brings the lever farther over in order to take the largest driven wheel into tooth with the reversing-pinion, which is constantly rotating in the opposite direction to the driving-shaft, while by placing the sleeve in such a position that none of the wheels are in tooth then the driving and driven shafts are disconnected and drive is no longer transmitted to the counter-shaft $i$ and back axle.

In connection with each of the shaft-bearings in the gear-box a siphon-lubricator is arranged with the lids preferably coming flush with the top of the said box.

To provide the necessary flexibility to admit of the counter-shaft $i$ conforming to the rising and falling movements made by the rear axle when the car is running, the opposite ends $i'$ $i^2$ of the said counter-shaft are connected to the rear end of the driven shaft $h^{11}$ of the speed-gear and to the driving bevel-pinion of the differential gear by universal joints $j$, which admit of the said shaft turning in any direction without interfering with the drive. Each joint is inclosed within a cover-sleeve $j'$, rotating with the shaft, and in order to provide for the application of braking force to the counter-shaft the sleeve of the foremost joint carries a drum $j^2$, encircled by a band-brake $j^3$, comprising two semicircular strap-segments $j^{14}$, made, preferably, of a T-section, with the surfaces which are opposed to the periphery of the drum being faced with leather to increase the frictional grip when the brake is applied. One end of each strap is jointed to a stud $j^5$, fixed to the rear end of the speed-gear box, while the means for closing the band straps or sections around the drum consists of a lever pivoted to the upper termination of the one strap and connected by means of a short jointed link to the adjacent termination of the other strap, the arrangement being such that when the lever is pulled over by the means provided for the purpose the two segments are drawn into frictional contact with the circumference of the drum, and the rotation of the counter-shaft is retarded. The drive is transmitted from the counter-shaft $i$ to the back axle $c$ by a bevel-pinion $i^3$ on the former and a bevel-wheel $k$, connected through the medium of the balance or differential gear to the latter, the whole of these gears being inclosed within a two-part case or box $m$, cast, preferably, in aluminium and with the two sections $m'$ $m^2$ (which are connected together by a series of bolts passed through coinciding eye-lugs on the said parts) being carried, respectively, at the inner ends of the sleeves $m^6$, inclosing the two halves $c^8$ $c^9$ of the divided axle. The shape of the case is suitable for inclosing the parts above mentioned, and it carries the bearings of the several rotating elements. The driving-pinion $i^3$ is arranged in the front part of the left-hand half of the casing, with the foremost bearing $i^4$ of the spindle $i^5$ being carried in a split or two-part cap $i^6$, fitting into an opening $m^7$ in the said front, while the rearmost or inward bearing $i^8$ fits into a socket $i^9$, cast internally on the side of the said left-hand casing-section, while to take any forward thrust that may be exerted through the pinion a ball-race ring $i^{49}$ is arranged around the spindle to abut against the inside of the removable cap, and a corresponding race $i^{10}$ is made on the opposed face of the pinion, within which a series of antifriction-balls $i^{11}$ are arranged.

The driven bevel-wheel $k$ consists of a ring of hardened steel of suitable diameter having bevel-teeth to engage those of the pinion $i^3$, and this ring is secured by bolts $i^{13}$ between opposed flanges $i^{14}$ $i^{15}$ on the lid $i^{16}$ and body part $i^{17}$ of the box $i^{18}$, inclosing the balance-gear, (which is itself of an ordinary construction,) so that the bevel-wheel and balance-gear box rotate bodily together, and their motion is transmitted through the internal gear contained within the said box $i^{18}$ to the halves of the two-part axle in the usual manner. The bearings on which the said gear-box and axle-sections run are specially constructed with a view to making provision for the ready adjustment of the bevel-wheel, so as to bring it into proper mesh with the teeth of its driving-pinion, the arrangement for this purpose being as follows: The inner ends $i^{19}$ $i^{20}$ of the axle-sections are provided with fixed bushes or short sleeves $i^{21}$ $i^{22}$, the innermost parts of which are encircled in turn by sleeves $i^{23}$ $i^{24}$, extending from the sides of the balance-gear box, while their outer ends are formed with ball-bearing cones $i^{25}$ $i^{26}$, respectively, opposed to the ball-races $i^{27}$ $i^{28}$ of adjustable cups $i^{29}$ $i^{30}$, contained within side pockets of the driving-gear case. The sides of the balance-gear box are also provided with fixed cones $i^{31}$ $i^{32}$, arranged concentric with the sleeves on the axle ends and with their bearing-surfaces respectively opposed to second ball-races $i^{33}$ $i^{34}$ in the aforesaid cups $i^{29}$ $i^{30}$. With this arrangement four series of ball-bearings $i^{31}$ $i^{32}$ $i^{33}$ $i^{34}$ are provided between the rotating gear-box and divided shaft and the double-raced cups fixed to the driving-gear case.

The hubs of the road-wheels are made fast in the usual way to the outer ends of the divided axle, and ball-bearings $i^{35}$ are provided between the hubs and the ends of the cover-sleeves which carry the differential-gear case. These bearings are formed by rigidly securing to the inner end of each hub a ball-raced cone $i^{36}$, surrounded by a ball-raced cup $i^{37}$, with the series of balls interposed between the races of their respective parts. To provide for the adjustment of the bearings and also of the bevel wheel and pinion of the transmission-gear, each cup is carried at the outer end of a long wormed shank or extension $i^{38}$, passed over the axle and screwing into the outward end of the cover-sleeve, which is internally wormed and longitudinally split for a suitable distance and is surrounded by a split clip $i^{39}$, drawn together or contracted by means of a cotter-pin or nut and bolt at $i^{40}$. Each of the said end cups is provided with holes or depressions $i^{41}$, with which a suitable tool is engaged when the cup requires to be turned for adjustment, and similar holes (not shown in the drawings) are provided in the inner cups $i^{29}$ $i^{30}$, screwing into the side pockets of the gear-case, which has slots or holes (also not shown) at convenient parts through which such tool may be introduced, while the cups themselves are locked in their adjusted positions by cotter-pins $i^{42}$, drawn into contact with portions of their screwed peripheries. By removing one of the sections of the split cap inclosing the part of the gear-case in which the driving-pinion works the said pinion may be readily inspected to enable the driver to ascertain whether the bevel pinion and wheel are meshing properly.

The adjustment of the driven wheel laterally, so as to take it into proper mesh with its pinion, is effected in the following manner: The clips on the ends of the axle-cover sleeves are first slackened to release the outer ball-cups, which are rotated and moved inward a short distance. The cotter-pins of the cups in the gear-case are then withdrawn, so as to free the said cups, one of which is screwed or backed into its pocket by rotating it away from its opposed cones on axle and balance-gear box, while the other cup is rotated in the opposite direction and advanced out of its pocket and in doing so pushes, through the intervening balls, against the opposed cones on the axle and gear-box, which are thereby moved bodily and laterally, and thus the bevel-wheel connected to and moving with the said box is adjusted up to its pinion. The first-named inclosed cone is now adjusted properly to its balls and both cones locked in their pockets by replacing and driving home their cotter-pins. Finally the outer axle-bearings are readjusted by rotating the cups in the usual way and then locking them by contracting the split clips around the ends of the cover-sleeves. None of the parts of the balance-gear are disturbed in making this adjustment, as the same moves with the divided axle without their relative positions being altered.

The rear axle, as already mentioned, carries the rear springs, upon which the frame of the car is mounted, and is further connected to the said frame by the drive-stays, which consist of obliquely-disposed members jointed at their rearward ends to suitable fittings clipped onto the axle-cover sleeves and at their forward ends to brackets or knuckles clipped onto the longitudinal members of the main framing. For the purpose of adjusting the length of these stays each is made in two parts, connected together by a right and left hand threaded coupling-nut so arranged as to come forward and clear of the rear wheel, and thus be readily accessible for placing a spanner or tool upon it.

The rear wheels are provided with brake-drums $o$, bolted to flanges on the inner ends of the hubs and encircled by spring friction or brake bands $o'$, one end $o^2$ of each band being connected by a jointed link $o^3$ to a fixed arm $o^4$, rigidly connected to the spring-brackets previously referred to as being carried by the extended ends of the rearmost cross-stay of the main frame, while the other end $o^5$ of each said band is connected, by means of a pull-rod $o^6$, to an arm $o^7$ on the extreme end $o^8$ of a transversely-disposed rock-shaft $p$, mounted within bearings $p'$ $p^2$, carried by brackets $p^3$, secured to the longitudinal tubes of the main frame and to which the whole of the foot-operated levers which control the brake mechanism and the main clutch are fulcrumed, the said shaft $p$ also forming the center for carrying a double-armed lever, hereinafter described, of the mechanism which operates the speed-change and reversing gear, and this method of arranging the several levers upon a common shaft greatly facilitates the erection of the car and simplifies the structure. The foot-operated pedal-levers are three in number, $q$, $r$, and $s$, the first one, $q$, being rigidly secured, by means of a clip $q'$ at its end $q^2$, to the rock-shaft $p$, and when depressed it turns the said shaft, communicates motion through the arms $o^7$ and pull-rods $o^6$, and thus applies both band-brakes $o'$ simultaneously to the drums $o$ on the rear wheels for retarding the said wheels and the driven axle. The second lever $r$ is the clutch-release lever and is carried at its inner end from a sleeve $r'$, which is loose upon the rock-shaft and is provided with a depending arm $r^2$, from which a jointed connecting-rod $r^4$ proceeds forward to an arm $j^4$ on the shaft $f^{19}$, which carries the levers $f^{18}$ for drawing the driven drum of the main clutch $f$ out of contact with the driving member. The third lever $s$ is adapted both to throw out the main clutch $f$ and also apply the band-brake $j^3$ to the counter-shaft $i$, so as to both disconnect the engine and retard the motion of the vehicle, which is usually done prior to changing speed. This lever $s$ is also carried at its inner end from a sleeve $s'$, loose upon the rock-shaft $p$, and at a suitable point it is provided with an ear or stud $s^2$, which bears upon the top edge of the second-named or clutch-release lever $r$, while the third lever itself bears upon an arm $s^3$ of and is adapted (when depressed) to actuate a bell-cranked lever $s^4$, pivoted to a stud $s^5$ on the speed-gear box and having jointed to its other arm the connecting-rod $s^7$, running to the link-and-lever mechanism, which closes the band-brake around the rotating drum $j^2$ on the counter-shaft. It will thus be understood that when this third lever is depressed it actuates the clutch-release mechanism by its stud $s^2$ depressing the lever thereof, and also applies the counter-shaft brake in the manner above described.

The steering-gear is controlled by a hand-wheel $t$ at the summit of a steering-post $t'$, supported on ball-bearings $t^2$ within an inclined column $t^3$, fixed near its lower end by means of the fitting $t^4$ to one of the longitudinal tubes of the underframe. The extreme lower end of the steering-post is arranged to actuate suitable steering mechanism connected with the pivot-mountings of the front or steering wheels, which said pivots are vertically disposed and turn in bearings at the opposite ends of the front axle, as usual.

Arranged adjacent to the steering-wheel, so as to be within convenient reach of the driver, is the hand-lever $u$, by which the change-speed and reversing gear is controlled and which has in conjunction with it special means for preventing the said lever from being inadvertently placed in position for throwing in the reverse-gear. The lever itself is fulcrumed to one end of a pin carried in a bearing supported by a bracket clipped onto the same frame-tube as supports the steering-post, and from the other end of this joint-pin an arm extends down by the side of the speed-gear box and has its lower end jointed to a connecting-rod $u^3$, jointed at its rearward termination to the arm $u^4$ of a double-armed lever or rocker $u^5$, the sleeve $u^6$ of which is loose upon the shaft $p$ and turns thereon as a fulcrum, while the second depending arm $u^7$ is coupled by means of a link $u^8$ to the termination of the controlling-slide of the said speed and reversing gear, so that when the hand-lever $u$ is pulled over the slide is traversed and the gear-wheels placed in the required position. The upper part of the speed changing and reversing lever works between a pair of separated sector arms or plates $u^9 u^{10}$, connected together at the opposite ends by bolts and distance-pieces $u^{11}$ and carried upon a clip or fitting $u^{12}$, secured to one of the said sides and adapted to embrace and be closed around or brazed onto the steering-column at a convenient distance below the steering-wheels. On the inner side of one of the said sector-plates a series of notches or slots $u^{13}$ are cut extending from the top to the bottom edge and corresponding, respectively, to the positions in which the lever has to be placed for throwing in the low, the intermediate, or the high-speed or the reverse gear, and alternating with these "in-gear" notches are other notches $u^{14}$, corresponding to the various "out-of-gear" positions in which the lever may be placed and held. On the opposed face of the lever is a long tooth or rib $u^{15}$, adapted to be engaged with one or other of these notches by means of a bow-spring $u^{16}$, attached to the other face of the lever and having an abutment against the plain face of the other sector-plate, while the disengagement of the tooth is effected by pulling the lever laterally against the pressure of the spring. The means for preventing the lever from being put inadvertently into the back gear or reversing position is arranged as follows: The top of the lever is slightly cranked or bent over rearwardly at $u^{17}$ and carries an upright tubular extension $u^{18}$, surrounded or inclosed by a handle or grip $u^{19}$, capable of a vertical movement thereon. Fixedly secured to the top of the said handle is a depending rod or stalk $u^{20}$ of suitable length passing through the tubular extension of the lever, through the end of the lever itself, and downward behind the edge of the said lever and terminating in an attached block $u^{21}$, which normally lies upon the top edges of the sector-plates and is kept in that position by a spiral spring $u^{22}$, surrounding the lower end of the rod and abutting at top end against the cranked termination of the lever and at the bottom against the block. The block itself is capable of being lifted with the handle or grip and is steadied in such movement and prevented from twisting by attaching to the edge of the lever an abutment-plate $u^{23}$, against which the block bears and works. The notch into which the tooth of the lever has to be placed for throwing in the reverse-gear is at the rearward extremity of the sector, and between this notch and the low-speed notch the sector-plates are stepped upward or elevated at $u^{24}$, so that the rearmost parts of the edges are at a higher plane than the middle and foremost parts, and a pair of shoulders $u^{25}$ are provided in the path of the stop-block carried by the lever, and by the ends of the said stop coming against the said shoulders on the lever being pulled over the said lever is blocked against further movement rearward in the direction of the reverse-gear position, so that in order to get the lever into the said reverse position the driver has to make a distinct and positive movement apart from the backward pull—that is to say, he is compelled to lift the sliding handle to such an extent independent of the lever that will clear the stop in connection with it from the shoulders on the sector-plates and bring it into the plane of the elevated rear parts of the said plates and then only can the lever be placed in the back-gear position. On again pushing forward the lever the coiled spring in connection with the stop depresses the latter into its normal position.

I wish it to be understood that I do not limit myself to the precise arrangement of the blocking-stop and the means for raising it clear of the shoulders on the sector-plates, and the same may be lifted in various ways, so long as a positive movement is required to actuate the same distinct from the pull-over motion of the lever. Further, instead of elevating the ends of the sectors to form shoulders studs or projections may be provided on the edges of the plates, over which the stop has to be lifted in order to get the lever into the back-gear position.

Having fully described my invention, what I desire to claim and secure by Letters Patent is—

1. In a motor-car, the combination with the main driving-clutch and the speed-change gear as set forth, of a shaft directed transversely across the framing of the car, a lever for controlling the main driving-clutch, pedal-levers for operating the back-axle and counter-shaft brakes, and a double-armed rocker for transmitting motion to the speed-change gear, said levers and the rocker being all mounted on said shaft, as set forth.

2. In a motor-car, a motor, a crank-shaft therefor, a speed-change-gear mechanism provided with a driving-shaft, a driving-clutch carried by the driving-shaft, and a detachable fork for connecting said clutch to the crank-shaft of the motor, said connection between said clutch and crank-shaft being such as to permit of the removal of the former independently of the latter.

3. In a motor-car, a speed-change-gear mechanism, a driving-shaft therefor, an outer drum mounted on said shaft, a motor provided with a crank-shaft, a fork connection for coupling said outer drum to said crank-shaft, an inner drum adapted to frictionally clutch said outer drum, a longitudinally-extending slidable sleeve connected to said inner drum and mounted upon said driven shaft, a sleeve connected with said inner drum and surrounding said slidable sleeve, a spring interposed between said sleeves, means for causing frictional engagement between the said drums, and movement-transmitting devices connected with said speed-change-gear mechanism.

4. In a motor-car, a motor provided with a crank-shaft, a speed-gear driving-shaft, pinions carried thereby, a driven shaft, a slidable sleeve mounted upon said driven shaft, gear-wheels carried by said sleeve and adapted to suitably engage with and be operated by said pinions causing thereby the operation of said driven shaft, means connected with and adapted to shift said sleeve to cause the engagement of the pinions and gear-wheels, a driving-clutch carried by the speed-gear driving-shaft, and a fork connection for connecting said clutch to the crank-shaft of the motor.

5. In a motor-car, the combination with a motor and speed-change-gear mechanism suitably connected therewith and operated thereby, of a balance-gear, a driving counter-shaft, a pinion thereon operated by said mechanism, a driven toothed wheel adapted to mesh with said pinion to drive said balance-gear, and means to permit of adjusting laterally said driven wheel independent of the balance-gear.

6. In a motor-car, the combination with a motor and a speed-change-gear mechanism connected therewith and operated thereby, of an adjustable pinion connected with said speed-change-gear mechanism and operated thereby, a balance-gear connected with and operated by said pinion, a sectional rear axle operated by said balance-gear, adjustable bearings for said pinion, balance-gear and said rear axle, and means for releasing and relocking the said pinion, balance-gear and axle prior to and after adjustment, substantially as herein described.

7. In a motor-car, the combination of its frame, a motor supported by the frame, a speed-change-gear-reversing mechanism, a clutch connected with said mechanism and said motor for causing the operation of the former, a shaft extending transversely of the said frame, a lever mounted on said shaft for controlling the said clutch, a back axle connected with and operated by said speed-change-gear-reversing mechanism, counter-shaft brakes for said axle, and a pair of pedal-levers mounted on said shaft and adapted to operate the said brakes, substantially as described.

8. In a motor-car, a motor, a speed-change-gear mechanism, a driving-shaft for said mechanism, means for connecting said driving-shaft to said motor for operating said mechanism, an outer drum mounted on said shaft, an inner drum adapted to frictionally clutch said outer drum, a longitudinally-extending slidable sleeve connected to said inner drum and mounted upon said driving-shaft, a sleeve connected with said inner drum and surrounding said slidable sleeve, a spring interposed between the said sleeves, means for causing frictional engagement between the said drum, and movement-transmitting devices connected with said speed-change-gear mechanism.

9. In a motor-car, a motor, a speed-change-gear mechanism, a driving-shaft for said mechanism, means for connecting said driving-shaft to said motor for operating said mechanism, an outer drum mounted on said shaft, an inner drum adapted to frictionally clutch said outer drum, a longitudinally-extending slidable sleeve connected to said inner drum and mounted upon said driving-shaft, a sleeve connected with said inner drum and surrounding said slidable sleeve, a spring interposed between said sleeves, means for causing frictional engagement between the said drum, a counter-shaft suitably connected with said speed-change-gear mechanism, a bevel-pinion carried thereby, a sectional axle, a balance-gear for operating said axle, a bevel-wheel connected with said balance-gear and engaging said pinion to be operated thereby, and adjustable bearings for said pinion, balance-gear and axle.

In testimony whereof I have hereunto set my hand in presence of two subscribing witnesses.

CHARLES THOMAS BROCK SANGSTER.

Witnesses:
ARTHUR T. SADLER,
GAVIN RALSTON.